(12) United States Patent
Zhou et al.

(10) Patent No.: US 8,253,597 B2
(45) Date of Patent: Aug. 28, 2012

(54) KEYBOARD PROVIDING POWER CONTROL

(75) Inventors: Hai-Qing Zhou, Shenzhen (CN);
Chung-Chi Huang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 468 days.

(21) Appl. No.: 12/631,850

(22) Filed: Dec. 6, 2009

(65) Prior Publication Data
US 2011/0063142 A1 Mar. 17, 2011

(30) Foreign Application Priority Data
Sep. 11, 2009 (CN) .......................... 2009 1 0306921

(51) Int. Cl.
*H03M 11/00* (2006.01)
*H01H 13/02* (2006.01)
(52) U.S. Cl. ...................... 341/22; 361/679.08; 200/243

(58) Field of Classification Search .................... 341/22, 341/34; 200/243, 293, 517; 361/679.08, 361/679.09
See application file for complete search history.

(56) References Cited

U.S. PATENT DOCUMENTS
| | | | |
|---|---|---|---|
| 6,504,119 B1 * | 1/2003 | Ribeiro | 200/314 |
| 2007/0227864 A1 * | 10/2007 | Tsai | 200/293 |
| 2010/0213040 A1 * | 8/2010 | Yeh et al. | 200/243 |
| 2011/0292579 A1 * | 12/2011 | Koga | 361/679.01 |

* cited by examiner

*Primary Examiner* — Howard Williams
(74) *Attorney, Agent, or Firm* — Altis Law Group, Inc.

(57) ABSTRACT

A keyboard includes a plug communicating with an external input device, a printed circuit board (PCB), and a base. The PCB includes a first power pad and a second power pad electrically connected to the plug via a cable. The PCB outputs a control signal to the plug via the cable in response to the first power pad and the second power pad being electrically connected. The base includes a control and at least one positioning element for positioning the control on the base. The control includes a pushbutton, a first pin electrically connected to the first power pad, and a second pin electrically connected to the second power pad. The first pin and the second pin are electrically connected in response to the pushbutton being pressed.

9 Claims, 7 Drawing Sheets

KEYBOARD PROVIDING POWER CONTROL

BACKGROUND

1. Technical Field

The present disclosure relates to keyboards and, particularly, to a keyboard providing power control for turning a computer on and off.

2. Description of Related Art

A front panel of an enclosure of a computer may include a power control for turning the computer on and off. The enclosure is often placed on a floor or a lower shelf away from use-based elements controlling the computer. To turn the computer on and off, a user often needs to move to reach the power control, which can be inconvenient.

DETAILED DESCRIPTION

Figure 1:
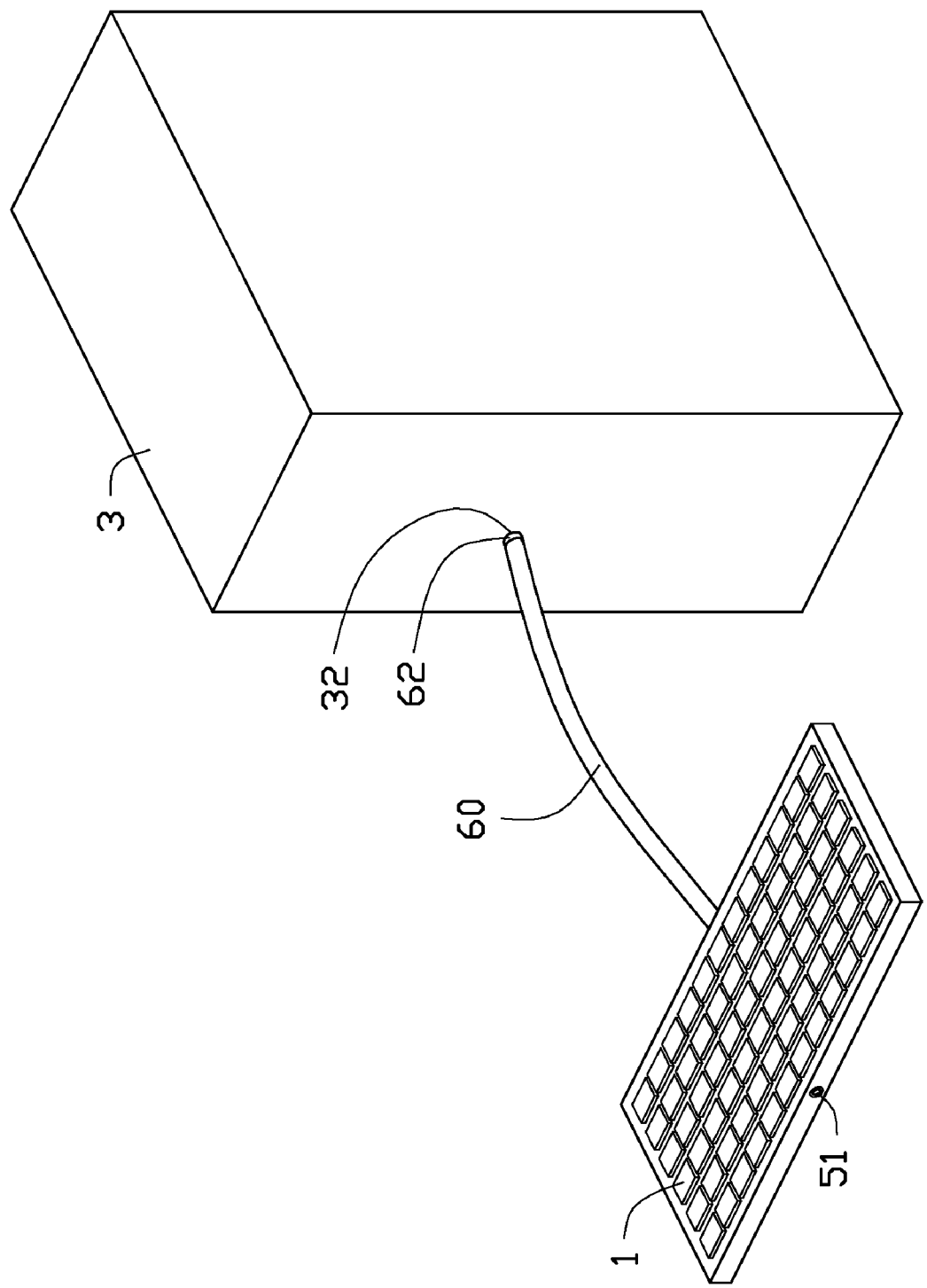
FIG. 1 is a schematic, isometric view of a first exemplary embodiment of a keyboard connected to a computer.
Figure 2:
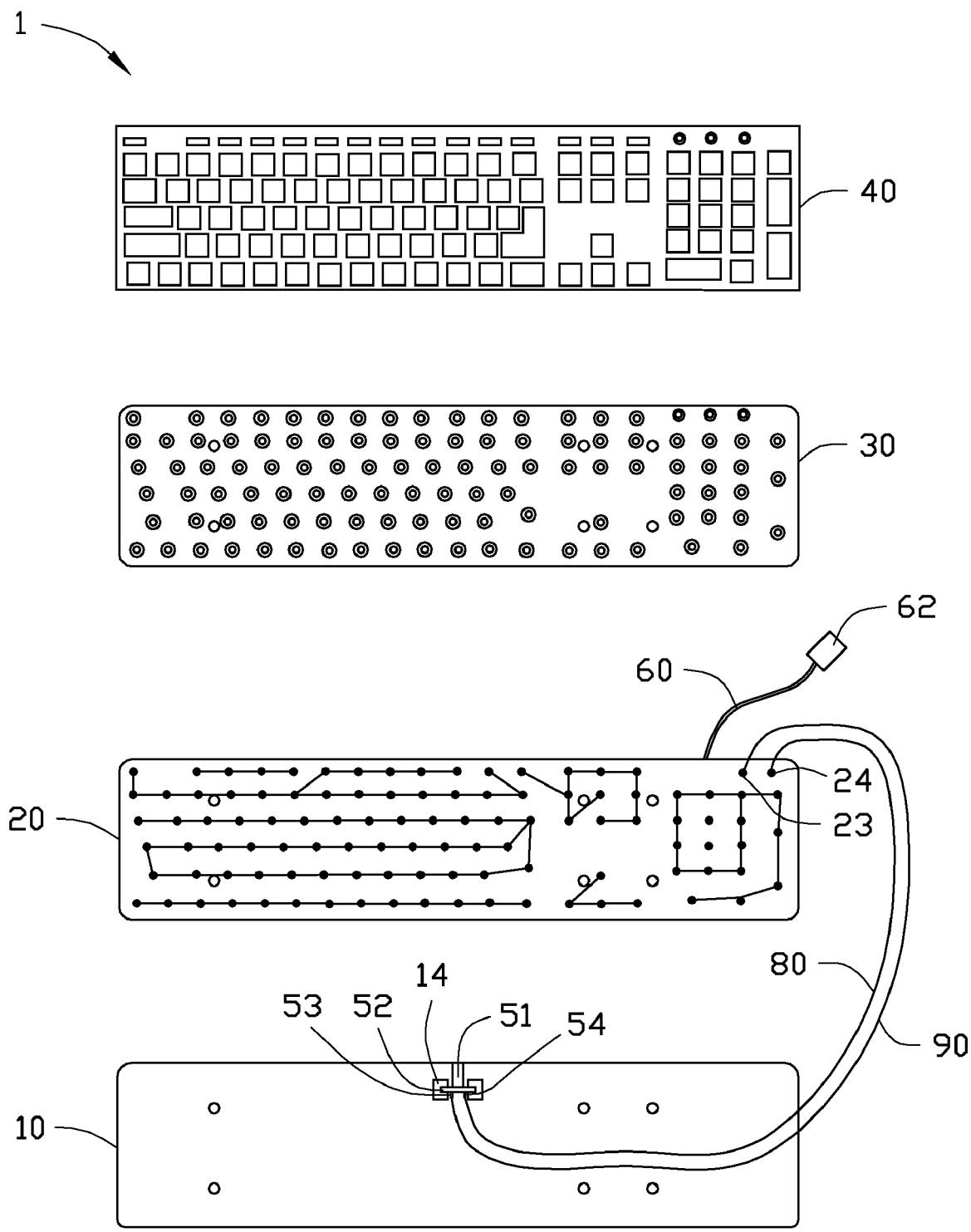
FIG. 2 is an exploded, schematic view of the keyboard of FIG. 1.
Figure 3:
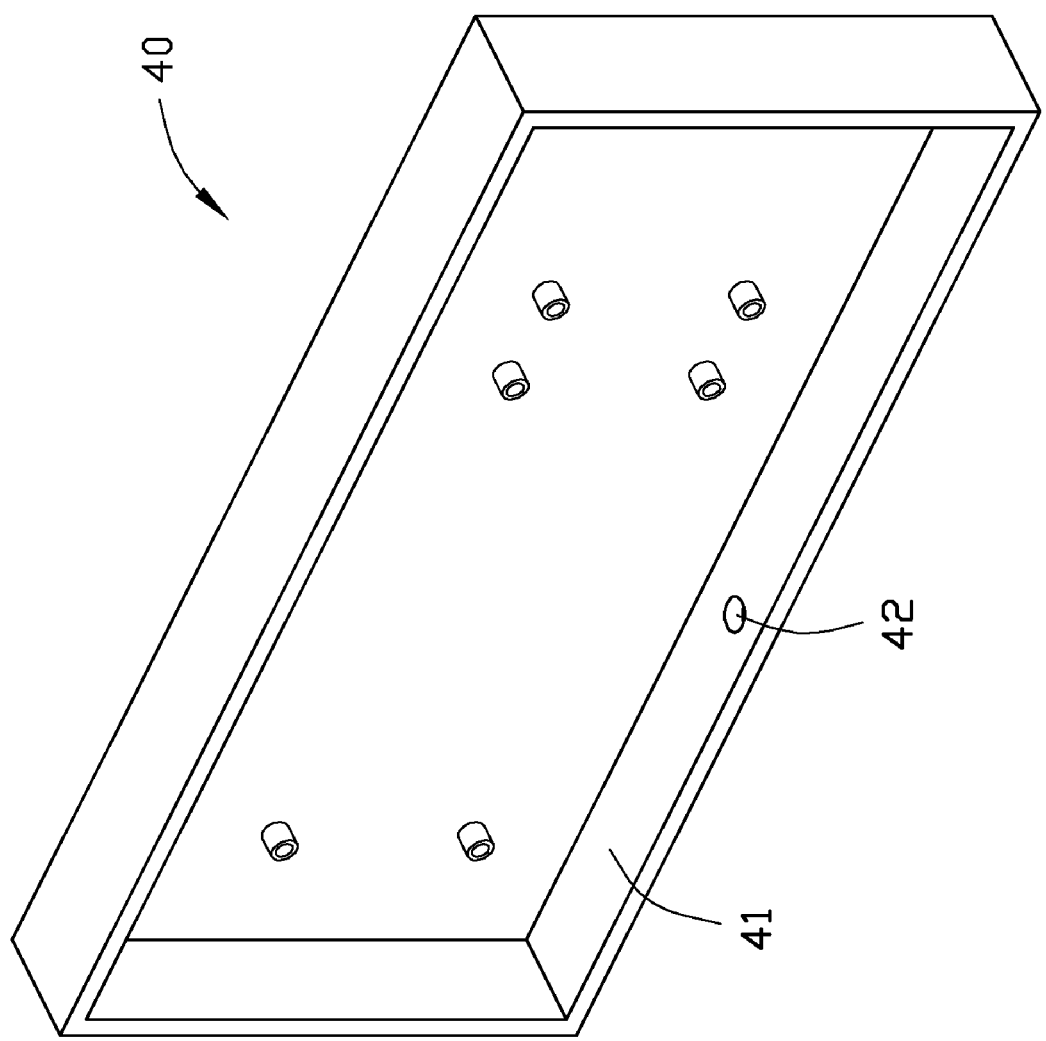
FIG. 3 is an isometric, schematic view of a cover of the keyboard of FIG. 1.
Figure 4:
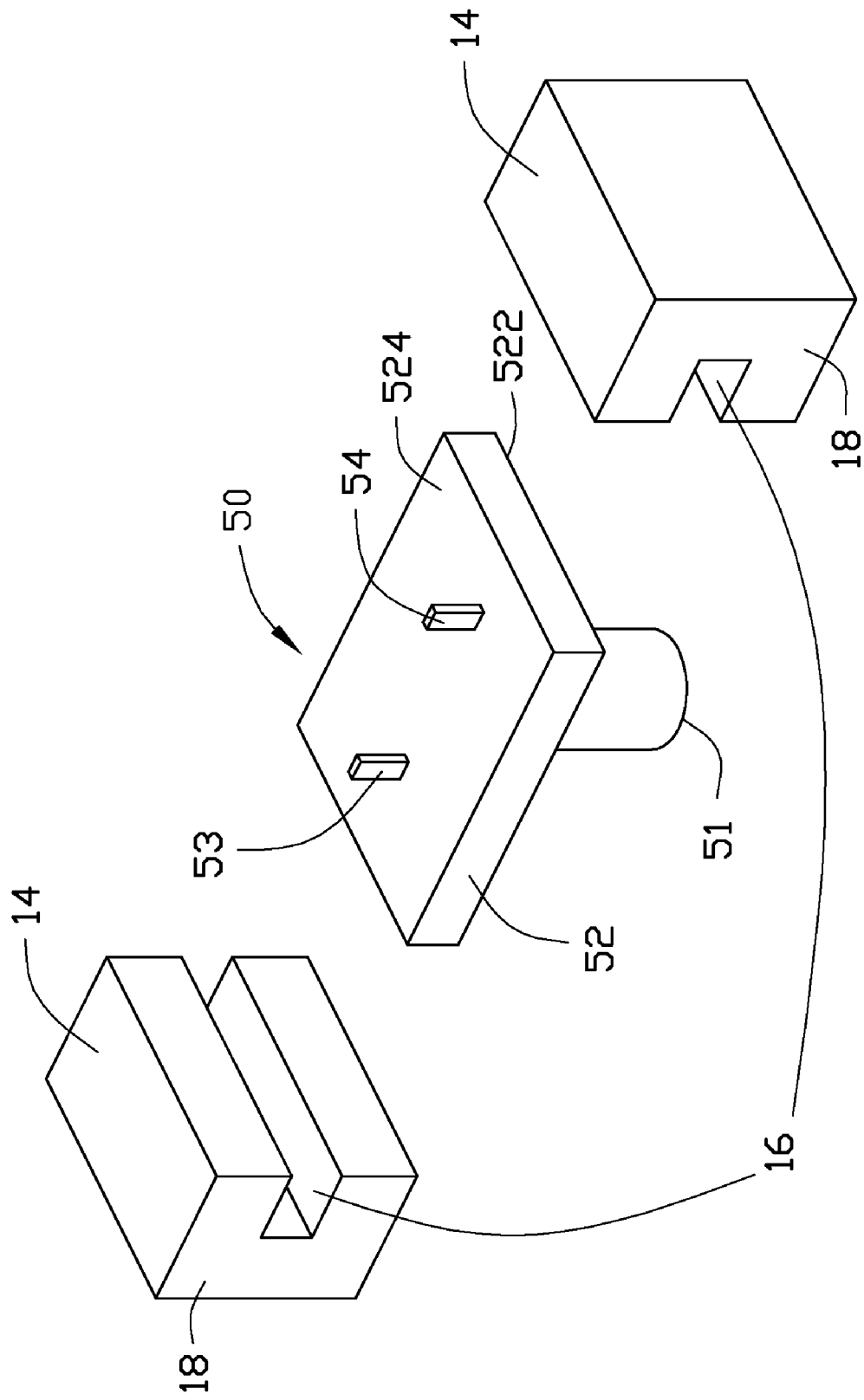
FIG. 4 is an exploded, isometric view of a control and two positioning elements of the keyboard of FIG. 1.

Referring to FIGS. 1 to 4, a first exemplary embodiment of a keyboard 1 includes a base 10, a printed circuit board (PCB) 20, a buffer layer 30, a cover 40, and a cable 60 having a plug 62, such as a PS/2 plug. It may be understood that the assembly relationships of the base 10, the PCB 20, the buffer layer 30, the cover 40, and the cable 60 fall within well-known technologies, and are therefore not described here.

The PCB 20 includes a first power pad 23 and a second power pad 24. The first power pad 23 and the second power pad 24 are electrically connected to the plug 62 via the cable 60. When the first power pad 23 and the second power pad 24 are electrically connected, the PCB 20 outputs a control signal to the plug 62 via the cable 60.

The base 10 includes two positioning elements 14 face to face attached to the base 10, and a control 50. Each positioning element 14 has a U-shaped configuration and defines a long groove 16. The control 50 includes a rectangular positioning body 52, and a columnar pushbutton 51 attached to a first side 522 of the positioning body 52. A first pin 53 and a second pin 54 are attached to a second side 524 of the positioning body 52 opposite to the first side 522. The control 50 is fixed on the positioning elements 14 via the positioning body 52 engaging the two grooves 16 of the two positioning elements 14. The columnar pushbutton 51 includes a pair of connected terminals capable of moving together with the columnar pushbutton 51 to respectively contact the first pin 53 and the second pin 54.

The cover 40 includes a key portion attached to an outer surface of a top wall thereof, a through hole 42 defined in a sidewall 41 thereof, corresponding to the pushbutton 51 of the control 50. Namely, when the cover 40 is mounted on the base 10, the pushbutton 51 is exposed via the through hole 42, and can be operated.

In assembly, the positioning body 52 of the control 50 is received in the grooves 16 of the positioning elements 14, with the pushbutton 51 parallel to the base 10. The PCB 20 and the buffer layer 30 are sequentially placed on the base 10. Then, the cover 40 is mounted on the base 10, with the pushbutton 51 extending through the hole 42 of the cover 40. The first pin 53 and the second pin 54 are electrically connected to the first power pad 23 and the second power pad 24 of the PCB 20 via wires 80, 90.

In use, the plug 62 is received in a corresponding keyboard interface 32 of a computer 3. When the pushbutton 51 of the control 50 is pressed, the first pin 53 and the second pin 54 are electrically connected, the PCB 20 outputs a control signal to the plug 62 via the cable 60 to turn the computer 3 on and off.

Figure 5:
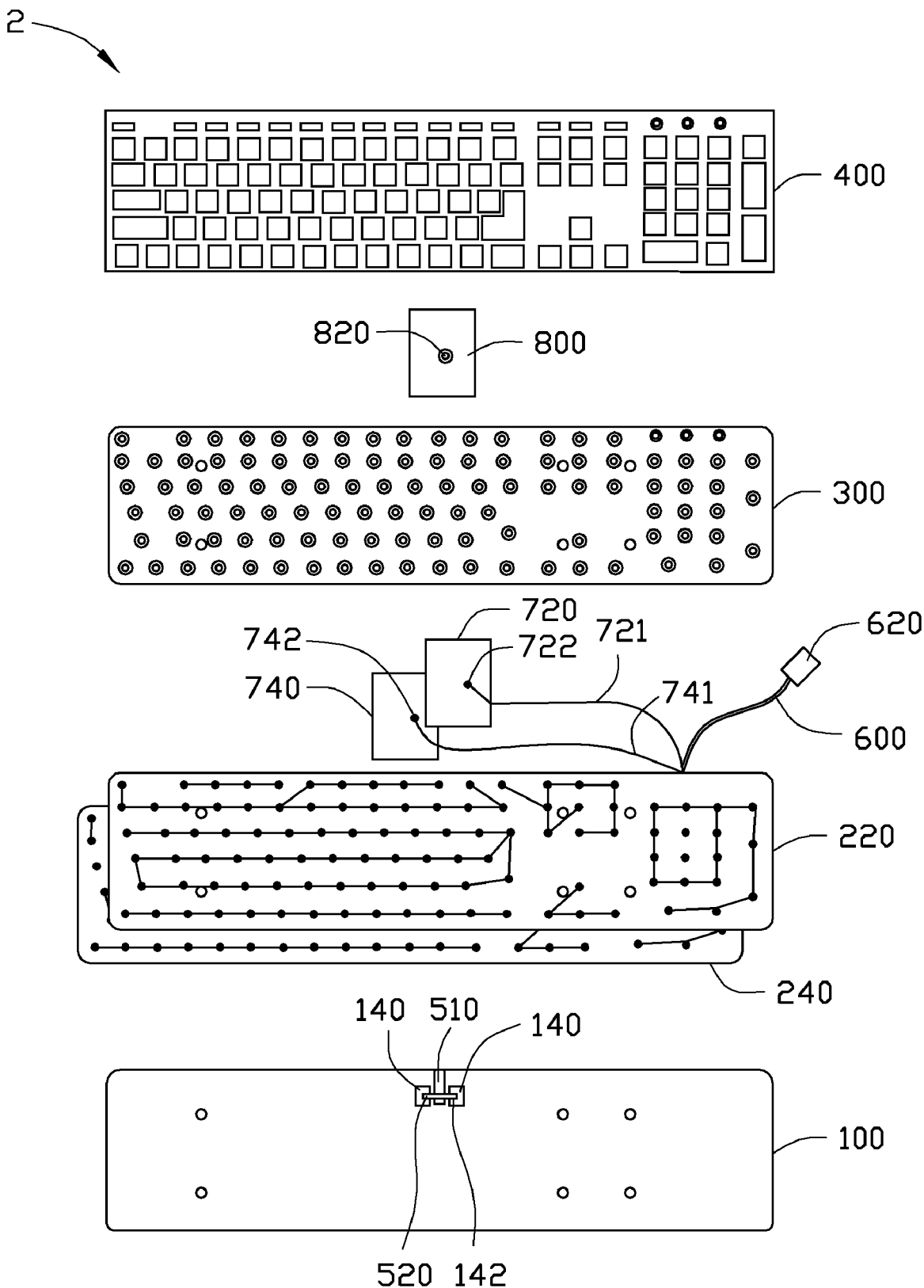
FIG. 5 is an exploded, schematic view of a second exemplary embodiment of a keyboard.
Figure 6:
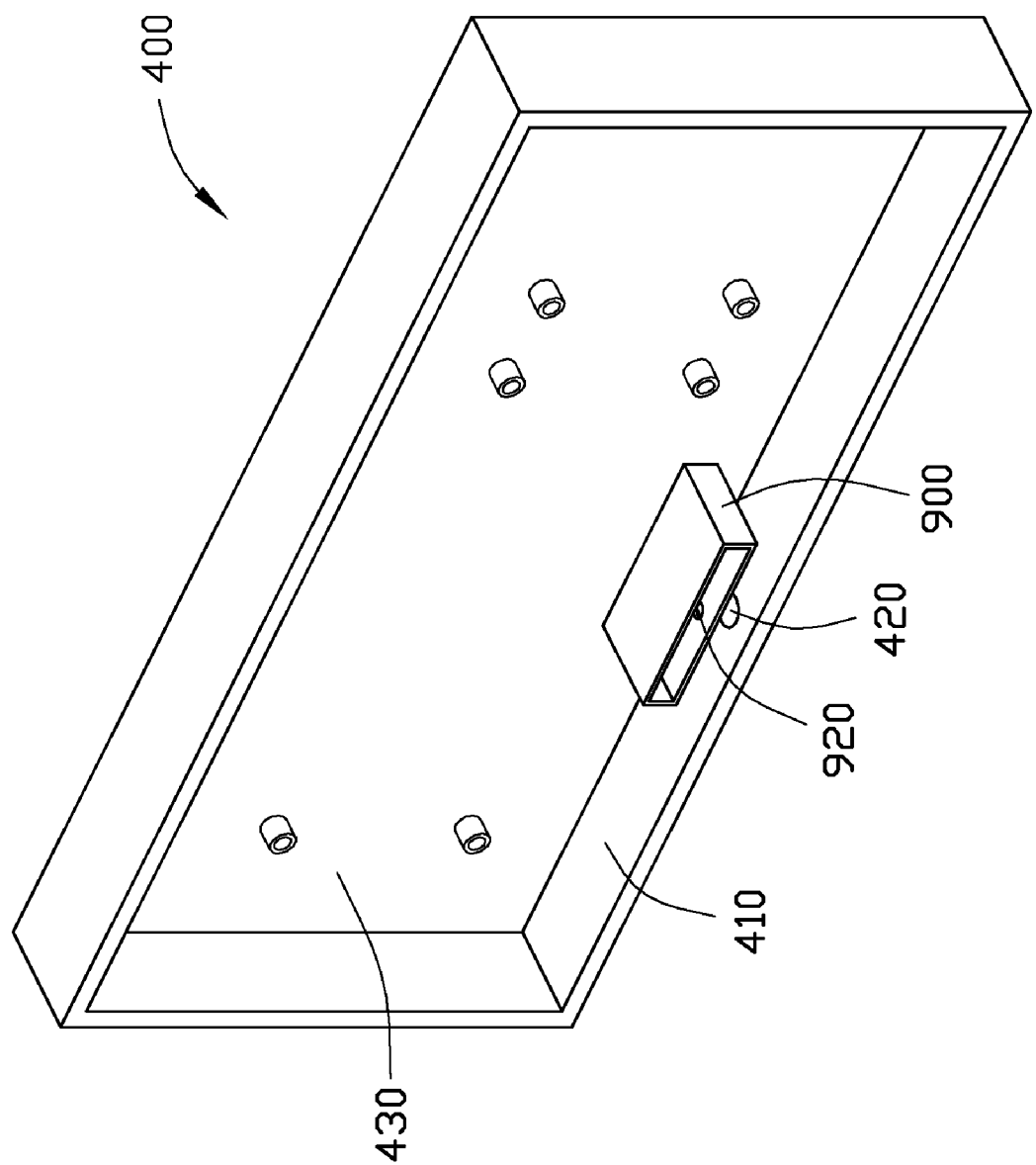
FIG. 6 is an isometric, schematic view of the cover of the keyboard of FIG. 5.
Figure 7:
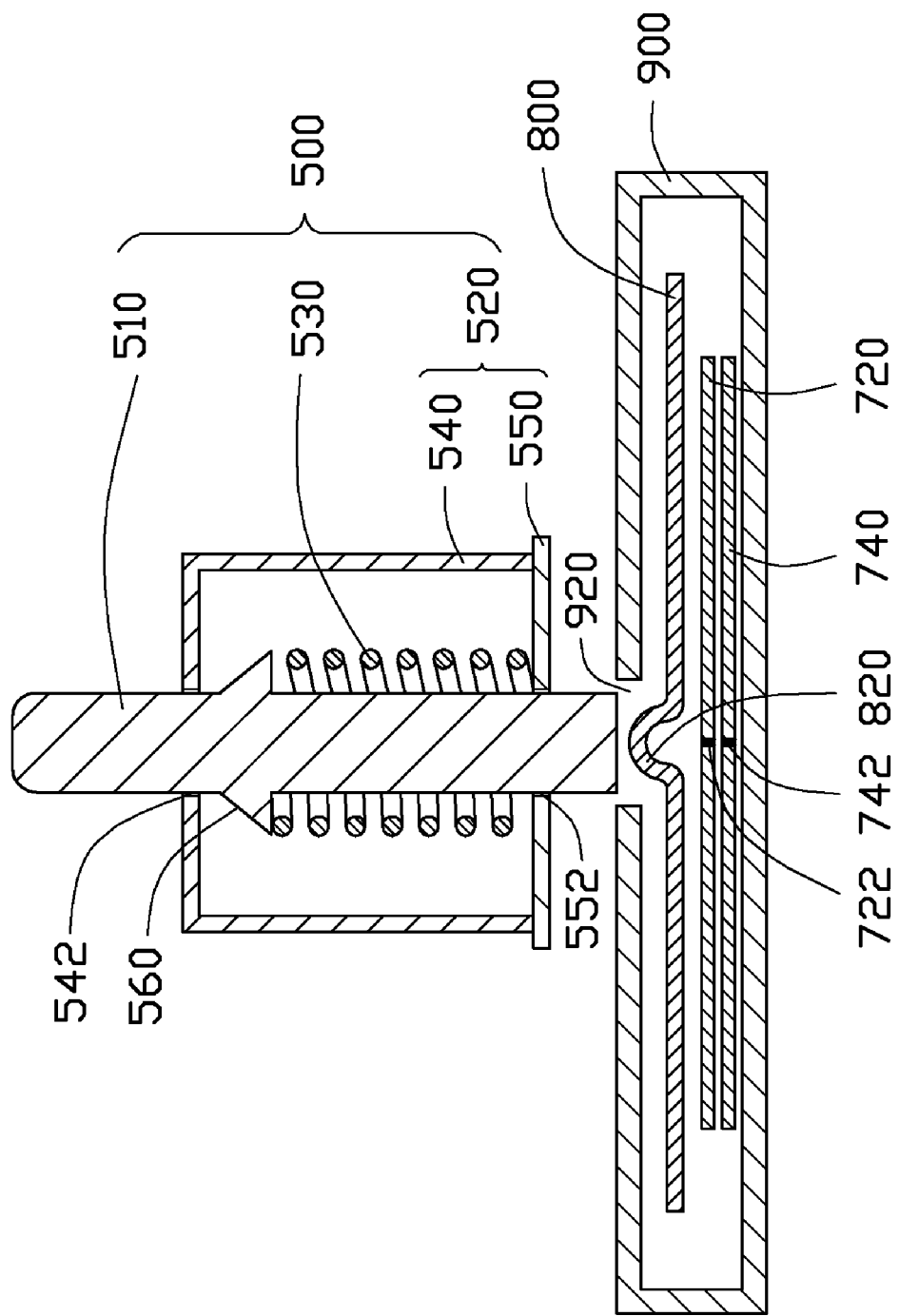
FIG. 7 is a partial, cross-section of the keyboard of FIG. 5.

Referring to FIGS. 5 to 7, a second exemplary embodiment of a keyboard 2 includes a base 100, a first PCB 220, a second PCB 240, a buffer layer 300, a cover 400, and a cable 600 having a plug 620, such as a PS/2 plug.

The keyboard 2 further includes a first control piece 720 electrically connected to the first PCB 220 via a cable 721, a second control piece 740 electrically connected to the second PCB 240 via a cable 741, and a control board 800. The first control piece 720 includes a first power contact 722, and the second control piece 740 includes a second power contact 742 corresponding to the first power contact 722. The control board 800 includes a spring point 820. When the first power contact 722 and the second power contact 742 are electrically connected to each other, the first and second PCBs 220 and 240 output a control signal to the plug 620 via the cable 600.

The base 100 includes two positioning elements 140 having a structure similar to the positioning elements 14, and a control 500. Each positioning element 140 defines a long groove 142.

The control 500 includes a columnar post 510 with first and second ends, a substantially rectangular positioning body 520, and a spring 530. The positioning body 520 includes a sleeve 540 and an end cover 550 covering the sleeve 540. The sleeve 540 defines a through hole 542 in a bottom wall thereof, and the end cover 550 defines a through hole 552 corresponding to the through hole 542. The post 510 is arranged in the sleeve 540 and the first and the second ends thereof are exposed via the through hole 542 and the through hole 552. The post 510 includes a blocking flange 560 extending from a circumferential surface thereof near the first end thereof. The spring 532 is fixed around the post 510 and sandwiched between the blocking flange 560 and the end cover 550. The control 500 is fixed on the base 100 via the positioning body 520 engaging the two grooves 142 of the two positioning elements 140.

The cover 400 includes a key portion attached to an outer surface of a top wall 430 thereof, a through hole 420 defined in a sidewall 410 thereof corresponding to the post 510, and a rectangular control case 900 mounted on an inside of the top wall 430 of the cover 400 near the through hole 420. The control case 900 defines a through hole 920 in a first sidewall thereof corresponding to through hole 420. The control board 800, the first control piece 720, and the second control piece 740 are placed one by one on a second sidewall of the control case 900 opposite to the first sidewall of the control case 900. When the first end of the post 510 is pressed, the second end of the post 510 is received in the control case 900 via the through hole 920 to abut the spring point 820, electrically connecting the first power contact 722 and the second power contact 742.

In use, the plug 620 is received in the corresponding keyboard interface 32 of the computer 3. When the post 510 is pressed, the first power contact 722 and the second power contact 142 electrically connect. Accordingly, the first and second PCBs 220 and 240 output the control signal to the plug 620 via the cable 600. When the keyboard interface 32 of the computer 3 receives the control signal via the plug 620, the computer 3 is turned on or off, thus increasing convenience.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A keyboard comprising:
a plug communicating with a computer;
a printed circuit board (PCB) comprising a first power pad and a second power pad, both electrically connected to the plug via a cable, wherein the PCB outputs a control signal to the plug via the cable in response to the first power pad and the second power pad being electrically connected; and
a base comprising a control and at least one positioning element for positioning the control on the base, the control comprising a pushbutton, a first pin electrically connected to the first power pad, and a second pin electrically connected to the second power pad, wherein the first pin and the second pin electrically connect in response to the pushbutton being pressed.

2. The keyboard of claim 1, wherein the at least one positioning element comprises two positioning elements face to face attached to the base and each positioning element has a U-shaped configuration and defines a groove, the control further comprises a positioning body, the pushbutton is fixed on the positioning body, the first pin and the second pin are fixed on the positioning body, the control is fixed on the positioning elements via the positioning body engaging the two grooves of the two positioning elements, the first pin and the second pin are electrically connected in response to the pushbutton being pressed.

3. The keyboard of claim 2, further comprising a cover defining a through hole corresponding to the pushbutton.

4. The keyboard of claim 1, wherein the plug is a PS/2 plug.

5. A keyboard comprising:
a plug communicating with a computer;
first and second printed circuit boards (PCB);
a first control piece electrically connected to the first PCB and a second control piece electrically connected to the second PCB, the first control piece comprising a first power contact, the second control piece comprising a second power contact corresponding to the first power contact, wherein the first and second PCBs output a control signal to the plug via a cable in response to the first power contact and the second power contact are electrically connected;
a base comprising a control and at least one positioning element for positioning the control on the base, the control comprising a post;
a control board attached to the cover; and
a cover comprising a control case defining a through hole corresponding to the post, the control board, the first control piece, and the second control piece placed in the control case, wherein the spring point of the control board is pressed by the post in response to the post being pressed, which make the first power contact and the second power contact be electrically connected.

6. The keyboard of claim 5, wherein the at least one position element comprises two positioning element face to face attached to the base and each position element has a U-shaped configuration and defines a groove, the control engages into the two grooves of the two positioning elements.

7. The keyboard of claim 5, wherein the control further comprises a positioning body and a spring, the positioning body comprises a sleeve and an end cover covering the sleeve, the sleeve defines a through hole, and the end cover defines a through hole corresponding to the through hole of the sleeve, wherein the post is arranged in the sleeve and two ends thereof are exposed via the through hole of the sleeve and the through hole of the end cover, and the post extends a blocking flange, the spring is arranged between the blocking flange and the end cover.

8. The keyboard of claim 5, wherein the cover further comprises a through hole corresponding to the post.

9. The keyboard of claim 5, wherein the plug is a PS/2 plug.

* * * * *